United States Patent [19]

Force

[11] Patent Number: 4,879,369

[45] Date of Patent: Nov. 7, 1989

[54] METHOD OF REMOVING LIGNIN FROM TALL OIL

[75] Inventor: Carlton G. Force, Mt. Pleasant, S.C.

[73] Assignee: Westvaco Corporation, New York, N.Y.

[21] Appl. No.: 146,200

[22] Filed: Jan. 20, 1988

[51] Int. Cl.$^4$ ............................ C09F 1/02; B01D 3/14
[52] U.S. Cl. .................................... 530/205; 159/4.01; 159/16.3; 162/14; 162/16; 203/95; 208/43
[58] Field of Search .................. 203/DIG. 6, 95, 30, 203/49; 208/363, 43, 356; 159/16.3, 4.01; 162/14, 16; 530/205

[56] References Cited

U.S. PATENT DOCUMENTS

| | | | |
|---|---|---|---|
| 2,143,345 | 1/1939 | Frankel et al. | 260/97.7 |
| 2,886,492 | 5/1959 | Hanson et al. | 203/82 |
| 3,496,071 | 2/1970 | Spence | 203/72 |
| 3,175,916 | 3/1965 | Costigliola et al. | 260/97.5 |
| 3,528,959 | 9/1970 | Patrick, Jr. et al. | 260/97.5 |
| 3,644,179 | 2/1972 | Knoer et al. | 203/84 |
| 3,923,768 | 12/1975 | Powers et al. | 260/97.5 |
| 3,948,874 | 4/1976 | Palmqvist | 260/97.7 |
| 4,126,604 | 11/1978 | Alford et al. | 260/97.5 |
| 4,259,459 | 3/1981 | Force | 260/97.5 |
| 4,481,145 | 11/1984 | Timms | 260/97.5 |
| 4,613,410 | 9/1986 | Rivers, Jr. | 203/89 |

FOREIGN PATENT DOCUMENTS

| | | | |
|---|---|---|---|
| 0520650 | 1/1956 | Canada | 260/97.7 |
| 0735676 | 8/1955 | United Kingdom | 260/97.7 |

*Primary Examiner*—Virginia Manoharan
*Attorney, Agent, or Firm*—Terry B. McDaniel; Richard L. Schmalz

[57] ABSTRACT

Lignin is removed from a crude tall oil in the production of tall oil fractions suitable for use as chemical ingredients and additives in other products by sparging the crude tall oil at a temperature of between about 350° F. to 400° F. with a carrier gas to depolymerize and remove from the tall oil lower molecular weight lignin materials.

4 Claims, No Drawings

METHOD OF REMOVING LIGNIN FROM TALL OIL

The present invention relates to a method of removing trace amounts of lignin from tall oil, and more particularly, to a method of reducing the trace concentrations of lignin from tall oil by-products of a kraft woodpulping process to improve use of the tall oil as a chemical ingredient or additive, such as an emulsifier in emulsion polymerization of rubber.

BACKGROUND OF THE INVENTION

Tall oil is a major by-product of the kraft or sulfate pulping process employed in the manufacture of paper. In such a process, rosin acids and fatty acids which occur in pine wood as free acids or their esters are saponified in the black cooking liquor to their corresponding sodium salts. Black liquor separated from the cellulose portion of the wood in a kraft pulping process contains, among other things, sodium sulfite, sodium sulfide, about 8% sodium salts of lignin materials, fatty acid soaps, rosin acid soaps, and unsaponifiable organic compounds. The soaps which separate from the aqueous phase at a stage during evaporation of water from the black liquor float on the partially concentrated black liquor to form a layer of soap skimmings. The recovered skimmings are treated with sulfuric acid to convert the soap skimmings to the free carboxylic acid form known as crude tall oil.

In addition, the soap skimmings carry with them some black liquor, as a result of incomplete separation, and this black liquor contains lignin salt a lower molecular weight fraction of which, after acidification, will dissolve in the crude tall oil acids. Thus, black liquor left in the soap contributes to the lowering of the crude tall oil quality and its acid number. Acid number is a measure of the free resin acids and fatty acids available and recoverable, and expressed in the number of milligrams of KOH per gram of sample needed to neutralize the same.

Crude tall oil is a dark brown mixture of fatty acids, rosin, and neutral materials. The fatty acids are primarily a mixture of unsaturated oleic and linoleic acids and saturated palmitic and stearic acids. Rosin is composed of resin acids. Crude tall oils are fractionally distilled to separate them into heads (low boiling fractions), tall oil fatty acids, distilled tall oil (mixed fatty and resin acids), rosins, and pitch (residue).

The tall oil fractionally distilled product collected from the mid-cut fractions of the crude tall oil, i.e., the tall oil fatty acids, distilled tall oil, and rosins, are widely employed as emulsifiers in polymerization of rubber. After distillation, the mid-cut fractions of tall oil are sometimes disproportionated, as with an iodine catalyst, by heating at high temperature for one or more hours, typically at 485° F. for about 1 to 2 hours. Disproportionation involves the step of heating fractions of the crude tall oil in the presence of certain catalysts to produce a molecular double-bond rearrangement in the labile abietic-type acids and linoleic fatty acid to convert them into stable hydrogenated and dehydrogenated acids. Disproportionation catalysts include sulfur dioxide, iodine, nickel, and palladium. The disproportionated tall oil undergoes less oxidation in end use applications in that the conjugated double bond systems of the abiatic-type acids are removed. After disproportionation, the tall oil mid-cut fraction is steam sparged at a temperature of around 440° F. to remove iodine and certain trace amounts of lignin present therein.

The amount of lignin in crude tall oil has been analyzed to be on the order of 0.5–4%. This lignin is sufficiently low in molecular weight to be soluble in the crude tall oil and its volatility is such that it distills over in the same boiling ranges as the various tall oil fractions. It is known from the literature that lignin decomposes more than it is polymerized at temperatures of between about 300° F. to 400° F., whereas higher temperatures approaching 550° F. promotes lignin polymerization over degradation.

The presence of lignin in tall oil emulsifiers used in emulsion polymerization of rubber or other like polymers is deleterious to both the polymerization rate and latex quality. Lignin makes the polymerization reaction particularly sensitive to traces of oxygen that are present in commercial continuous emulsion polymerization reactor systems. Such sensitivity causes a reduction in polymerization rate in the presence of oxygen and also reduces production throughput unless extra initiator is utilized in the polymerization reaction. This reduction in polymerization rate is due to the lignin-oxygen impurities which terminate the growing rubber molecules in latex particles before they would normally terminate through interaction with a new free radical produced by the initiator. For this reason, polymer chains terminated by lignin-oxygen impurities are, on the average, lower in molecular weight than normal. This creates an undesirable degree of stickiness in rubber, together with other detrimental effects in the physical properties of rubber.

In a present method of producing tall oil latex emulsifiers, the iodine catalyst employed in the disproportionation step decomposes the lignin present in the feed stock to low enough molecular weight that it is removed from the product along with the iodine during the steam sparge after disproportionation. However, to satisfactorily destroy this lignin and prevent its carryover into the final product, it has been necessary to carry out the disproportionation reaction at such a high temperature, e.g., 485° F., that a portion of the product is decarboxylated. There is also some degradation of color in the product at this temperature. These factors adversely effect the quality of the rubber products produced using the tall oil emulsifiers in the polymerization reaction.

BRIEF OBJECTS OF THE PRESENT INVENTION

It is therefore an object of the present invention to provide an improved method for removing lignin from tall oil products employed as ingredients and additives in other chemical reactions.

It is another object to provide an improved method of removing trace amounts of lignin from tall oil fractions employed as emulsifiers in the emulsion polymerization of rubber and like polymers.

It is a more specific object to provide an improved method of removing lignin from crude tall oil to improve its use as an emulsifier in emulsion polymerization of rubber.

BRIEF SUMMARY OF THE PRESENT INVENTION

The method of the present invention comprises the steps of gas sparging tall oil at a temperature of between about 350° F. to 400° F. to depolymerize and remove lower molecular weight lignins therefrom. Preferably, sparging of the tall oil may be carried out by passing steam through the crude tall oil prior to its fractional distillation to remove the lower molecular weight lignin fragments from the tall oil so they will not repolymerize at the higher distillation temperatures.

The tall oil fractions so sparged may be further refined, e.g., disproportionated to produce products of considerably lighter color and increased acid number. Disproportionation may also be carried out at lower temperatures than heretofore employed, e.g., as low as about 425° F., producing less of a color increase and increasing the acid number of the disproportionated products. If the sparged tall oil is further heat-treated, after sparging, at a temperature of between about 500° to 525° F. for about two hours, much of the remaining lignin polymerizes to be more effectively separated in the pitch during fractional distillation.

DETAILED DESCRIPTION OF PREFERRED EMBODIMENTS

The degree of gas or steam sparging to which the crude tall oil is subjected for lignin removal may be monitored by use of a sulfanilic color spot test and may serve as a guide to the subsequent emulsifier's performance in the presence of oxygen during emulsion polymerization. The reagent employed in this test is a freshly prepared solution of diazobenzene sulfonic acid obtained by diazotizing sulfanilic acid with nitrous acid in the presence of hydrochloric acid. The reagent is prepared by dissolving 0.5% sulfanilic acid in a 2% hydrochloric acid solution. Into a depression of a white porcelain spot plate is mixed four drops of this reagent solution and four drops of 0.5% sodium or potassium nitrite. The mixture is neutralized with seven drops of 10% sodium carbonate. The tall oil sample to be analyzed is added from a microburet in the form of a pH 12.3 soap solution made up at 10% solids. A yellow color develops which may intensify slightly with age. Immediately after this test with an unknown is complete, an adjacent cavity in the spot plate is prepared. To this cavity is added 10% pH 12.3 soap solution of tall oil mixed acid emulsifier which has been well characterized for oxygen sensitivity in the polymerization reaction. The test is carried out by measuring from a microburet the amount of this standard soap required to match the color in the depression containing the emulsifier with the unknown amount of lignin. Colors produced by 0.03 ml., 0.06 ml., and 0.09 ml. of the unknown soap solution were matched with required amounts of 10% pH 12.3 known soap solution. The ratio required to produce a match for each color intensity was established by dividing the volume of the standard soap by the volume of the sample of unknown lignin content.

Typically, for most crude tall oil compositions, it has been found that color remains constant, and only small constant amounts of low molecular weight lignin are removed in the sparge, after steam sparging is conducted at about 400° F. for a period of about two hours.

Emulsion polymerization characteristics and sulfanilic acid spot test results are compared between emulsifiers made from steam sparged crude tall oil and from unsparged crude tall oil in the following example.

In a one liter round bottom three neck flask equipped with a thermometer, a mechanical half moon stirrer, a fritted glass filter stick to introduce the steam, and an outlet tube bent 180° to carry the existing vapors into a downleg condenser 500g of crude tall oil maintained at 400° F. was steam sparged for 2 hours and 35 minutes. All of the condensate from this condenser was collected periodically during sparging in 35ml volume portions. Aliquots from these were neutralized to pH 12.3 and analyzed by the sulfanilic acid spot test. It was determined that lignin removal had decreased to a constant minimum amount at the end of two hours of sparging. The sparge flask was supported in a heating mantle used to control the temperature of the crude tall oil being stream treated. In a two neck round bottom flask, 450g of the above steam sparged crude tall oil was distilled at 505° F.. This was accomplished by gradually reducing the pressure in the distillation system from three torr where the heads began distilling to 0.5 torr where distillation of the mid-cut fraction ceased. The heads fraction amounted to 9.4%, the mid-cut 70.1%, and the bottom pitch remaining in the flask 19.5% of the original 450g. Distillation time was 2 hours and 25 minutes.

Disproportionation of 282.6g of the mid-cut fraction from the above distillation was carried out in a one liter Parr pressure reactor. To the distilled tall oil was added 0.52g of iodine catalyst and it was reacted with stirring 2 hours and 35 minutes at 428° F.. The temperature was raised to 450° F. for 55 minutes until gas chromatographic analysis showed that no more abiatic type acids were present in the product. The product was steam sparged 1½ hours at 482° F. to remove the iodine catalyst and decomposition residues.

A distillation was performed on 600g of the same crude tall oil but which had not been steam sparged. Higher temperature known to decompose lignin in the presence of iodine was used for disproportionation. In the one liter Parr reactor, 285.5g of the distillation mid-cut fraction was disproportionated at 482° F. for 1½ hours using a 0.478g iodine catalyst. The reaction was steam sparged 1½ hours at 482° F. to remove the iodine catalyst and decomposition residues.

Comparative analyses between these two products are shown in the table.

| LIGNIN REMOVAL BY STEAM SPARGING CRUDE TALL OIL | | | | | | |
|---|---|---|---|---|---|---|
| | Sulfanilic Acid Color Match Results | | | Polymerization Oxygen Sensitivity Conversion in 6 hrs | | |
| Disproportionated Product | Test in ml | Standard in ml | Ratio | without air | with air | Difference |
| Steam Sparged Crude Tall Oil | 0.03 | 0.05 | 1.7 | 53.6% | 46.0% | 7.6% |
| | 0.06 | 0.09 | 1.5 | | | |
| | 0.09 | 0.16 | 1.8 | | | |
| Control Untreated Crude Tall Oil | 0.03 | 0.12 | 4.0 | 47.9% | 31.7% | 16.2% |
| | 0.06 | 0.25 | 4.2 | | | |

LIGNIN REMOVAL BY STEAM SPARGING CRUDE TALL OIL

| Disproportionated Product | Sulfanilic Acid Color Match Results | | | Polymerization Oxygen Sensitivity Conversion in 6 hrs | | |
|---|---|---|---|---|---|---|
| | Test in ml | Standard in ml | Ratio | without air | with air | Difference |
| | 0.09 | 0.40 | 4.5 | | | |

That which is claimed is:

1. A method of processing tall oil for use as an emulsifier in the polymerization of rubber comprising the steps of:
   sparging crude tall oil at a temperature of between about 350° F. and 400° F. with a carrier gas for at least about one hour to depolymerize and remove lower molecular weight lignin materials from the crude tall oil, then
   heat-treating the sparged crude tall oil at a temperature of between about 500° F. and 525° F. for about two hours to polymerize any lignin remaining therein, then
   fractionally distilling the crude tall oil, said distilling including the removal of a pitch fraction containing polymerized lignin, then
   disproportionating the tall oil by heating the distilled tall oil in the presence of a disproportionation catalyst at a temperature of about 425° F. and then sparging the disproportioned tall oil with a carrier gas to remove said disporportionation catalysts.

2. The method of claim 1 wherein said carrier gas is steam.

3. A method of removing lignin from tall oil comprising the steps of:
   sparging crude tall oil at a temperature of between about 350° F. to 400° F. with a carrier gas for at least about one hour to depolymerize and remove lower molecular weight lignin materials from the crude tall oil, then
   heat-treating the sparged crude tall oil at a temperature of between about 500° F. and 52° F. for about two hours to polymerize any lignin remaining therein and then
   fractionally distilling sparged, heat-treated crude tall oil, said distilling including the removal of a pitch fraction containing polymerized lignin.

4. The method of claim 3 wherein said carrier gas is steam.

* * * * *

UNITED STATES PATENT AND TRADEMARK OFFICE
CERTIFICATE OF CORRECTION

PATENT NO. : 4,879,369

DATED : November 7, 1989

INVENTOR(S) : Carlton G. Force

It is certified that error appears in the above-identified patent and that said Letters Patent is hereby corrected as shown below:

In claim 3, column 6, line 23, delete "52°F" and substitute therefor --525°F--.

Signed and Sealed this

Ninth Day of November, 1993

*Attest:*

BRUCE LEHMAN

*Attesting Officer*     *Commissioner of Patents and Trademarks*